(12) United States Patent
Justome

(10) Patent No.: US 6,481,377 B1
(45) Date of Patent: Nov. 19, 2002

(54) PACKAGING FOR TRANSPORTING IN EMERGENCE LIVING FISH OF THE PLEURONECTIFORM SPECIES

(75) Inventor: Bruno Justome, Landevant (FR)

(73) Assignee: France Turbot, Noirmoutier (FR)

( * ) Notice: Subject to any disclaimer, the term of this patent is extended or adjusted under 35 U.S.C. 154(b) by 0 days.

(21) Appl. No.: 09/582,409

(22) PCT Filed: Dec. 23, 1998

(86) PCT No.: PCT/FR98/02844

§ 371 (c)(1),
(2), (4) Date: Aug. 8, 2000

(87) PCT Pub. No.: WO99/33336

PCT Pub. Date: Jul. 8, 1999

(30) Foreign Application Priority Data

Dec. 24, 1997 (FR) ............................................. 97 16520

(51) Int. Cl.⁷ ............................................. A01K 63/02
(52) U.S. Cl. ....................................................... 119/203
(58) Field of Search ................................. 119/201, 203, 119/218

(56) References Cited

U.S. PATENT DOCUMENTS

| | | | | |
|---|---|---|---|---|
| 4,214,551 A | * | 7/1980 | McNeil et al. | 119/218 |
| 4,455,966 A | * | 6/1984 | Knowles | 119/203 |
| 5,117,777 A | * | 6/1992 | Takasugi | 119/203 |
| 5,156,111 A | * | 10/1992 | Heggelund | 119/218 |

FOREIGN PATENT DOCUMENTS

| | | |
|---|---|---|
| DE | 1153935 b | 9/1963 |
| FR | 2215894 | 8/1974 |
| FR | 2382861 | 10/1978 |
| GB | 2265289 a | 9/1993 |
| JP | 3254619 | 11/1991 |
| JP | 8119361 | 5/1996 |

* cited by examiner

*Primary Examiner*—Robert P. Swiatek
(74) *Attorney, Agent, or Firm*—Young & Thompson

(57) ABSTRACT

A packaging for transporting in emergence living fish the pleuronectiform species, includes at least one box (1) opening from above and whose bottom is provided with an active surface (2) for receiving the fish to be packaged in flat position. The support active surface (2) for the fish consisting of ventilated solid (3) and void (4), the solid (3)/void (4) ratio of the active support surface (2) ranging between 0.25 and 9 to provide an efficient cutaneous respiration to the fish support surface.

8 Claims, 2 Drawing Sheets

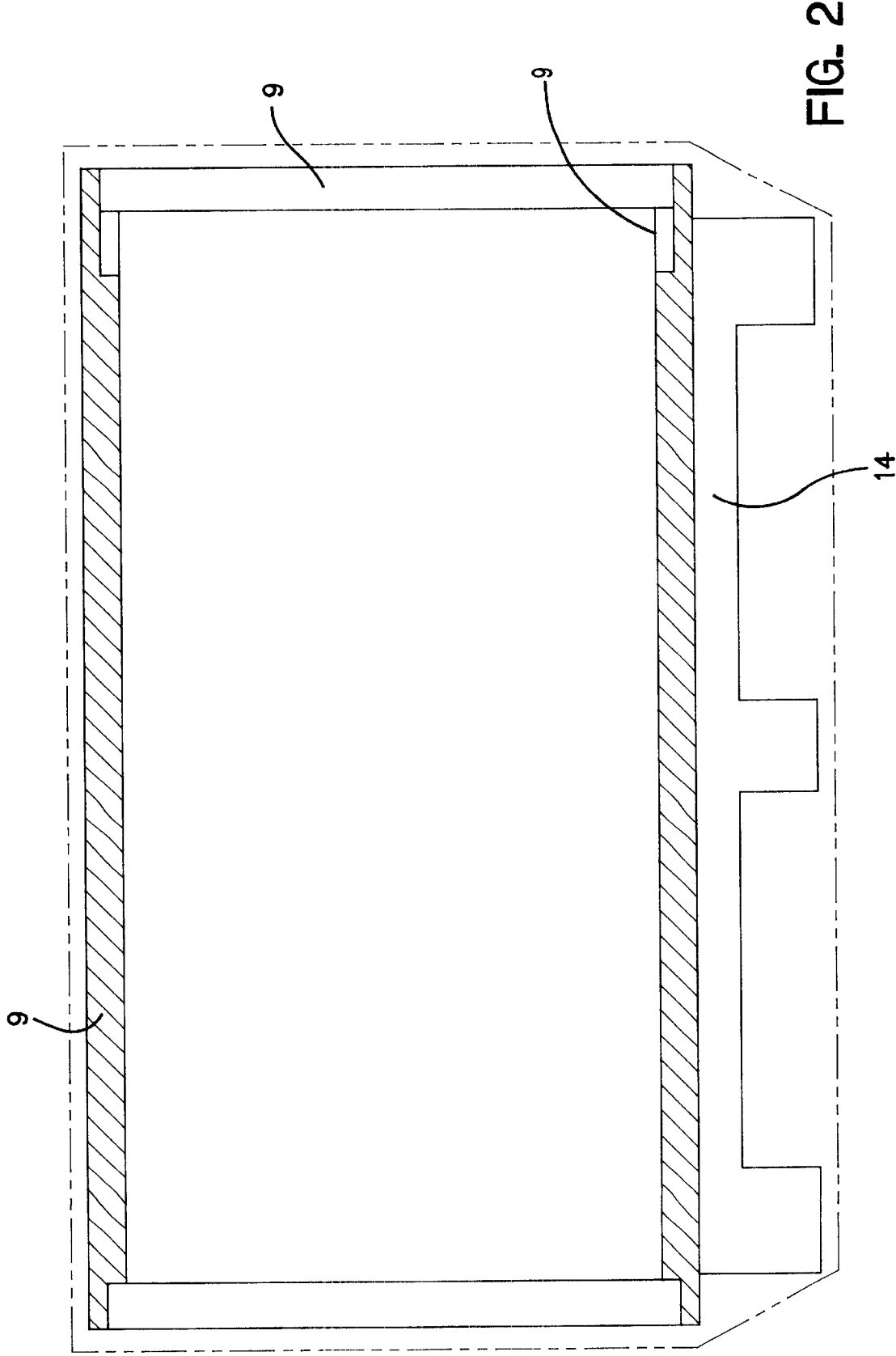

PACKAGING FOR TRANSPORTING IN EMERGENCE LIVING FISH OF THE PLEURONECTIFORM SPECIES

CROSS REFERENCE TO RELATED APPLICATION

This is the 35 USC 371 national stage of international application PCT/FR98/02844 filed on Dec. 23, 1998, which designated the United States of America.

FIELD OF THE INVENTION

The present invention relates to a packaging and a process for packaging for the transportation out of water of living fish of the order pleuronectidae.

BACKGROUND OF THE INVENTION

Numerous species of fish are at present transported alive and without water throughout the world. This is the case for example of sturgeon (*Acipenser sturio*) and carp (*Cyprinus carpio*) which have a natural capacity to survive a very long time (two to three days) out of water. Similarly, lobsters, because of their natural capacity to survive out of water, can be sent from the Canadian shores to Japan in simple polystyrene boxes containing only ice.

As is described in the document FR-A-2.215.894, there are moreover known packages adapted for the transportation and preservation of small animals such as shrimp, in which there is used a reduced quantity of water. In this case, the packaging is present in the form of a perforated plate, disposed within a package with a sealed bottom, the perforations of the plate permitting water below the animals to escape so that only a small film of water remains about the aquatic animals. The transportation therefore takes place under conditions in which a thin film of water is maintained about and above the animals disposed in the form of a layer. The present of water generates a certain number of problems in the case of aerial transport. Moreover, such a solution is difficult to practice by reason of the absence of control of the characteristics of the water film.

Other solutions consist in providing a box generally of plastic within which a fish is disposed. This box formed from a body and a cover, is provided with openings for the passage of water. The assembly is then placed in a container filled with water. The box permits protecting the fish during its transportation. Such a solution is particularly described in the document JP 3-254619.

For example, it has been demonstrated that a suitable preparation of these living fishes before transport can improve considerably their lifetime out of water. Thus, it has been demonstrated that sturgeons could be maintained alive out of water for several weeks if their temperature is brought below 0° C. This well-known phenomenon is called the anabiose phenomenon.

Because of this, special refrigeration machines dealing with this anabiose phenomenon have been developed. These machines are installed directly within aircraft. The problem with such installations is their cost, their size and their maintenance.

Until now, no packaging has been proposed for the transportation of species of fish naturally less resistant to survival out of water, as is the case for flat fish also called pleuronectidae.

SUMMARY OF THE INVENTION

The object of the present invention is thus to provide a packaging for the transportation out of water of living fish of the order pleuronectidae, of simple design, low cost and ease of preparation and loading into an aircraft while limiting to the maximum the handling of the fish.

Another object of the present invention is to provide a packaging for the transportation out of water of fish of the order pleuronectidae which permits obtaining a 100% survival rate of said fish after at least 24 hours out of water.

Another object of the present invention is to provide a process for the packaging of living fish of the order pleuronectidae including a series of steps that are simple to practice and that involve few manipulations by direct contact with the fish.

To this end, the invention has for its object a packaging for the transportation out of water of living fish of the order pleuronectidae, characterized in that it is constituted by at least one upwardly open box whose bottom is provided with an active surface for the flat reception of the fish to be packaged, this active support surface for the fish being constituted by solid parts and ventilated openings, the ratio (surface of solid/surface of openings) of said active support surface being comprised within the range 0.1–9 to permit effective cutaneous respiration of the supported surface of the fish. Thanks to this design of the packaging, the transported fish have no cutaneous marking after their transportation, and have a survival rate of almost 100% including after a transportation time greater than 24 hours.

According to one preferred embodiment of the invention, the volume of the box expressed in liters divided by six times the total weight expressed in kg of the fish to be packaged, is comprised between 0.4 and 2.5. Moreover, the active support surface for the fish can be constituted by the top of lugs that project from the surface forming the bottom of the box in an upward direction, the openings corresponding to the spaces left free between said lugs.

The invention also has for its object a process for packaging living fish of the order of pleuronectidae for their transportation out of water by means of a packaging of the above type, characterized in that there is placed flat on the bottom of a box loaded with ice, at least one, preferably two, generally fasted fish, in that there is placed on the bottom of a container carried by a pallet a flexible envelope impervious to water, in that there is placed within said envelope one or a plurality of boxes in the form of one or several piles, in that before or after sealed closing of said envelope, there is introduced into said envelope oxygen and in that the container disposed about said envelope is closed.

Such a process reduces greatly the handling by direct contact with the fish to be packaged, this handling always leading to disturbances or even wounding of the fish.

BRIEF DESCRIPTION OF THE DRAWINGS

The invention will be better understood from the reading of the following description of one embodiment, with reference to the accompanying drawings, in which:

FIG. 2 is a partially cross-sectional front view of a container constituting one of the elements of the packaging of the invention.

DETAILED DESCRIPTION OF THE INVENTION

Figure 1:
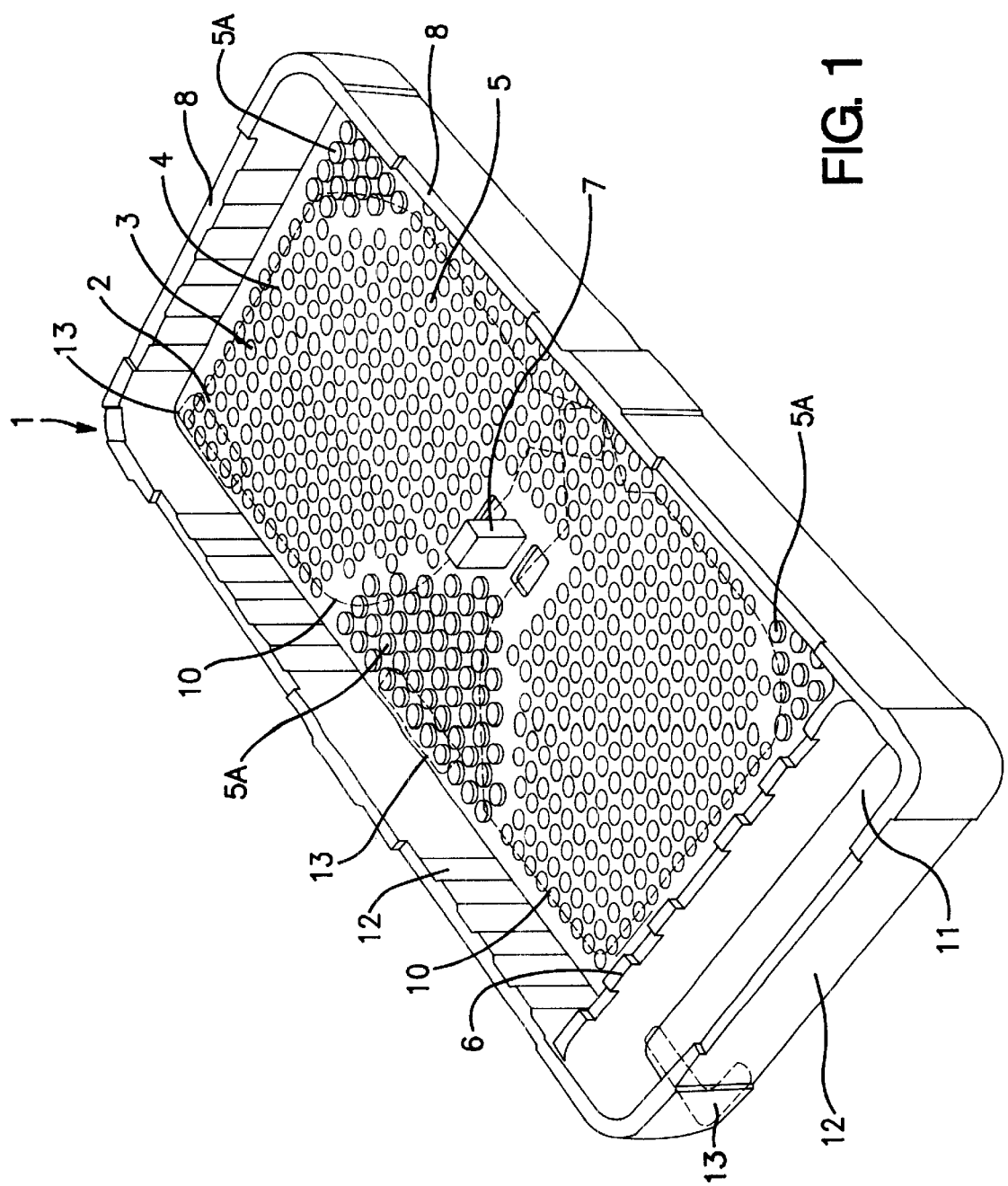
FIG. 1 is a perspective view of a box for packaging according to the invention.

The packaging of the invention is adapted to transport out of water living fish of the order pleuronectidae. Tests of the efficacy of this packaging have in particular been carried out on turbot.

This packaging is constituted by at least one box 1 of the type shown for example in FIG. 1. This box 1 is generally of polystyrene although any other material can be used. The polystyrene is preferred for its light weight and its low cost as well as its thermal insulating properties.

This box, of generally parallelepipedal shape, is upwardly open to permit the introduction within it of the fish to be packaged. The position of the fish in the box is shown in broken line 10 in FIG. 1.

The bottom of this box 1 is provided with an active surface 2 for the flat reception of the fish to be packaged. This active surface 2 for supporting the fish is constituted by closed members 3 and ventilated openings 4. By ventilated openings is understood the openings in which the atmosphere can be renewed, in particular because of their communication with the rest of the volume of the box or with the atmosphere outside the box.

The surface ratio of the closed portions 3/open surfaces 4 of this active support surface 2 is particularly important because it prevents or permits cutaneous respiration of the fish. Thus, the pleuronectidae are distinguished from other groups of fish by a colored upper surface with eyes and a blind almost colorless undersurface. This upper surface and this undersurface, for example provide in a turbot about 30% of the respiratory needs of the fish because of the aptitude of these surfaces to perform cutaneous gas exchange. The transportation out of water of these fish therefore requires placing these fish in conditions permitting this cutaneous respiration.

The active support surface 2 of the box 1 must not be harmful to the fish and in particular must not mark them.

For all the above reasons, this surface ratio of closed areas 3/open areas 4 of the active support service 2 is comprised within the range 0.11–9 and preferably comprised between 0.25 and 4. Failure to observe this ratio will not permit obtaining survival rates comparable to the economic requirements or sufficient survival time to permit transport from Europe to Asia, for example.

This active support surface 2 for the fish can have a large number of forms.

According to a preferred embodiment of this active support surface 2 for the fish, shown in FIG. 1, this surface 2 is constituted by the tops of lugs 5, 5A projecting from the surface forming the bottom of the box in an upward direction, the openings 4 corresponding to the spaces left free between said lugs 5, 5A. In the example shown in FIG. 1., the lugs 5 have a height of 7 mm and a diameter of 8 mm with a ratio of the closed surface to the open surface equal to 0.3 and the lugs 5A have a height of 12 mm, a diameter of 10 mm with a ratio against equal to 0.3.

Of course this active support surface for the fish can be made of a single piece with the bottom of the box or be constituted by means of a connected piece.

In the case of an active support surface made of lugs, at least portion 5A of the lugs of the box have a greater height than the rest of the lugs of this box. This difference of height is shown by the lugs 5A in dark line in FIG. 1. These lugs of greater height are more particularly arranged in the support zone for the fins of the fish to be packaged. In these positions, the cutaneous respiration of the fish is not as great as on their upper and lower surfaces. The fact of supporting the fins of the fish facilitates the circulation of air through the rest of the active support surface 2 of this box.

Moreover, the box 1 comprises on its upper edge cutouts 8 for horizontal circulation of gas between the boxes when these latter are disposed stacked. It also comprises on at least one internal and/or external surface of one of its sidewalls, vertical grooves 12, again to facilitate the circulation of air in said box 1. In the example shown in FIG. 1, the box comprises over all its external surfaces and over two internal surfaces of its sidewalls, grooves 12. The lateral external grooves permit the vertical circulation of the gas between the boxes in the stacked condition whilst the lateral internal grooves permit a vertical circulation of the gas within the box.

The volume of gas available within the box must be present in a sufficient quantity. For this reason, the volume of the box expressed in liters divided by six times the total weight expressed in kg of the fish to be packaged, is comprised between 0.4 and 2.5.

Finally, each box 1 is provided internally with a partition 6 for delimiting an ice chamber 11 of a capacity of the order of 0.6 liter of ice for example. This partition 6 has a generally crenelated upper edge, as shown in FIG. 1, to facilitate the mixing between the air contained in the ice chamber and the air contained in the rest of the volume of the box and thereby to maintain a suitable temperature and relative humidity within the box 1. The height of this partition 6 is selected so as to prevent any escape of ice or water from this ice chamber, including during takeoff and landing of an airplane.

This box 1 is generally a single use disposable packaging, which is to say used for a single transportation. This box is moreover adapted to be easily stacked. In the example shown in FIG. 1, this box comprises on its external surface of its bottom, stacking members 13 having the shape of lugs and shown in broken line. These members 13 are disposed in particular at the four corners of the box 1 and in the midzone of the box 1 to permit easy stacking of said boxes 1.

This box 1 is generally dimensioned to provide an active support surface 2 permitting the flat reception of at least two fish disposed side by side. As shown in FIG. 1, the tails of said fish overlap in the central portion of the box 1. A spacing lug 7 projecting from the bottom of the box is disposed in the central portion of this latter to prevent greater overlapping of said fish. Two supplemental recesses are provided in the bottom of the box to permit a modification of the position of the lug 7 as a function of the dimensions of the fish. It is to be noted that the box 1 shown in FIG. 1 is more particularly adapted for packaging turbot. For other species of the order pleuronectidae, the shape of the box could be subject to modification to adapt to the morphology of each species.

The fish disposed on a diagonal within the box are introduced into this latter after a preparation of their organism. Generally these fish are fasted for several days and the temperature of their body is lowered.

This packaging moreover comprises at least one box, an overpackaging (not shown) of the box or boxes being present in a flexible envelope enclosing one or several stacked boxes in the form of at least one pile. This envelope is closeable in a sealed manner to maintain at the interior of said envelope a controlled atmosphere. This atmosphere is generally strongly charged with oxygen. It has been noted that the vitality of the fish can be greatly augmented in the presence of an excess of oxygen.

In the case of the packaging of several boxes 1, the boxes are disposed in the stacked condition generally in the form of six piles. The height of the piles can vary from one package to another. These piles are disposed within the overpackaging. These operations are carried out generally on the bottom of a container 9 itself disposed on a pallet 14 as shown in FIG. 2. Accordingly, it suffices to close the container by assembly of the rest of the walls of this container at the bottom of the container and to maintain for example by hooping the walls in the assembled condition. There is thus obtained a pallet 14 ready to be loaded by means of a suitable transport engine into an airplane. Generally, the container 9 is made from polystyrene panels.

In another embodiment, not shown, it is possible to limit the packaging to at least one box and a container disposed on a pallet, said container enclosing one or a plurality of stacked boxes in the form of at least one pile. This solution is less suitable than the solution in which the boxes are over packaged.

As a result, to package living fish of the order pleuronectidae for their transport out of water, one carries out the following operations: one places flat on the bottom of a box 1 loaded with ice, at least one and preferably two fasted fish, one places on the bottom of a container 9 carried by a pallet 14 a flexible envelope sealed to water, one places within said envelope a plurality of boxes 1 disposed in the form of one or several piles and, before or after sealed closure of said envelope, there is introduced into said envelope oxygen, then the container 9 is closed, disposed about said envelope, in particular by assembly of the rest of the walls of said container. Once the container has been prepared, it suffices to move the pallet by means of a suitable transport engine for pallets to load the assembly of the container into an airplane. Once transported, the fish can be replaced for example in a reviver before their consumption.

It has moreover been noted that the introduction of oxygen into the envelope permits the fish to recover after transportation a liveliness identical to fish having not been subjected to such transport operations.

What is claimed is:

1. A packaging for transporting out of water living fish of the order pleuronectidae, which comprises: at least one upwardly opening box having a bottom provided with an active surface for the flat reception of the fish to be packaged; said active support surface for the fish being constituted by closed surfaces and ventilated openings; said closed surfaces being constituted by the tops of lugs which project in an upward direction from the surface forming the bottom of the box; said openings corresponding to spaces left between said lugs; the ratio of closed surfaces to open surfaces of said active support surface ranging between 0.11–9 to permit effective cutaneous respiration of the supported surface of the fish; said packaging further comprising an overpackaging of the box or boxes present in the form of a flexible envelope enclosing a plurality of boxes stacked in the form of at least one pile; said envelope being closable in a sealed manner to maintain within said envelope a controlled atmosphere strongly loaded with oxygen.

2. The packaging according to claim 1, wherein at least one portion of the lugs of the box has a height greater than the rest of the lugs of said box.

3. The packaging according to claim 1, wherein the volume of the box expressed in liters divided by six times the total weight expressed in kilogram of the fish to be packaged ranges between 0.4 and 2.5.

4. The packaging according to claim 1, wherein the box comprises a partition, which delimits a chamber for storing ice.

5. The packaging according to claim 1, wherein each box is dimensioned to provide an active support surface, which in use permits the flat reception of at least two fish disposed side by side, the tails of said fish overlapping in a central portion of said box; a spacing lug projecting from the bottom of the box and disposed in a median portion of said box for preventing total overlapping of said fish.

6. The packaging according to claim 1, wherein the box comprises sidewalls having internal and external surfaces, an upper edge provided with cutouts, and vertical grooves on at least one of said internal and external surfaces for facilitating air circulation in said box.

7. The packaging according to claim 1, further comprising a container disposed on a pallet; said container enclosing one or a plurality of boxes stacked in the form of at least one pile.

8. Process for packaging living fish of the order of pleuronectidae for their transportation out of water, which comprises:

providing at least one upwardly opening box having a bottom provided with an active surface for the flat reception of the fish to be packaged; said active support surface being constituted by closed surfaces and ventilated openings; said closed surfaces being constituted by the tops of lugs which project in an upward direction from the bottom of the box; said openings corresponding to spaces left between said lugs, and the ratio of closed surfaces to open surfaces ranging between 0.11–9;

arranging flat on the bottom of the box loaded with ice, at least one fish;

placing on the bottom of a container carried by a pallet a flexible envelope impervious to water;

disposing within said envelope at least two boxes stacked in the form of at least one pile;

introducing oxygen into said envelope before or after sealed closing said envelope; and closing the container disposed about said envelope.

* * * * *